(12) United States Patent
Eberle et al.

(10) Patent No.: US 10,337,943 B2
(45) Date of Patent: Jul. 2, 2019

(54) CENTRIFUGE AND METHOD FOR SENSING IMBALANCES IN THE CENTRIFUGE

(71) Applicant: ANDREAS HETTICH GMBH & CO. KG, Tuttlingen (DE)

(72) Inventors: Klaus-Guenter Eberle, Tuttlingen (DE); Christoph Pabst, Tuttlingen (DE); Marcellus Geiselmann, Tuttlingen (DE); Sebastian Fahrner, Aach (DE); Armin Brendle, Muehlhausen-Ehingen (DE)

(73) Assignee: ANDREAS HETTICH GMBH & CO. KG, Tuttlingen (DE)

( * ) Notice: Subject to any disclaimer, the term of this patent is extended or adjusted under 35 U.S.C. 154(b) by 60 days.

(21) Appl. No.: 15/526,331

(22) PCT Filed: Oct. 29, 2015

(86) PCT No.: PCT/EP2015/075163
§ 371 (c)(1),
(2) Date: May 11, 2017

(87) PCT Pub. No.: WO2016/074944
PCT Pub. Date: May 19, 2016

(65) Prior Publication Data
US 2017/0328804 A1 Nov. 16, 2017

(30) Foreign Application Priority Data

Nov. 12, 2014 (DE) .................. 10 2014 116 527

(51) Int. Cl.
*B04B 13/00* (2006.01)
*B04B 9/14* (2006.01)
(Continued)

(52) U.S. Cl.
CPC ............... *G01M 1/18* (2013.01); *B04B 9/10* (2013.01); *B04B 9/12* (2013.01); *B04B 9/146* (2013.01);
(Continued)

(58) Field of Classification Search
CPC .. B04B 9/12; B04B 9/14; B04B 9/146; B04B 13/00; B04B 9/10; B04B 2013/006; B04B 13/003; G01M 1/18; G01M 1/22
(Continued)

(56) References Cited

U.S. PATENT DOCUMENTS 2,487,343 A * 11/1949 Kopf .................. B04B 9/12
384/535
2,895,023 A * 7/1959 Blum ................. B04B 9/146
200/61.45 R
(Continued)

FOREIGN PATENT DOCUMENTS

CN 203685972 7/2014
DE 1001648 1/1957
(Continued)

OTHER PUBLICATIONS

The International Bureau of WIPO, PCT Preliminary Report on Patentability, dated May 26, 2017, Applicant: Andreas Hettich GMBH & Co. KG, International Application No. PCT/EP2015/075163.
(Continued)

*Primary Examiner* — Charles Cooley
(74) *Attorney, Agent, or Firm* — Woodling, Krost and Rust

(57) ABSTRACT

A centrifuge (10), comprising a rotor (12), a drive shaft (14), on which the rotor (12) is supported, a motor (18), which drives the rotor (12) via the drive shaft (14), a supporting unit (30) having damping elements (36), each of which
(Continued)

comprises a spring axis (36a), which supporting unit supports a rotational unit (19), which comprises the motor (18) together with the drive shaft (14) and the rotor (12), a sensor unit (82, 84) for sensing the rotational speed, a distance sensor (80) for determining imbalances of the rotational unit (19), which rotational unit rotates about an axis of rotation (14a), an acceleration sensor (88) for determining imbalances of the rotational unit (19), and a control and evaluation unit (90), which evaluates the data of the sensors (80, 82, 88), wherein the distance sensor (80) senses distance changes in an operative axis (36b). The invention is characterized in that the operative axis (36b) is oriented in relation to the axis of rotation (14a) in such a way that an angle between the operative axis (36b) and the axis of rotation (14a) of less than 90° including 0° results, at least in a projection onto a plane parallel to the operative axis (36b) and through the axis of rotation (14a).

18 Claims, 5 Drawing Sheets

(51) Int. Cl.
  *B04B 9/12* (2006.01)
  *B04B 9/10* (2006.01)
  *G01M 1/22* (2006.01)
  *G01M 1/18* (2006.01)
(52) U.S. Cl.
  CPC ............ *B04B 13/00* (2013.01); *G01M 1/22* (2013.01); *B04B 13/003* (2013.01); *B04B 2013/006* (2013.01)
(58) Field of Classification Search
  USPC .......................................................... 494/82
  See application file for complete search history.

(56) References Cited

U.S. PATENT DOCUMENTS

| | | | | |
|---|---|---|---|---|
| 2,969,172 A * | 1/1961 | Hutt | ............... | D06F 37/24 192/3.61 |
| 3,003,831 A * | 10/1961 | King | ............... | B60K 17/24 180/381 |
| 3,363,772 A * | 1/1968 | Jarvis | ............... | B04B 9/12 210/363 |
| 3,422,957 A * | 1/1969 | Fosler | ............... | B04B 9/146 200/33 R |
| 3,692,236 A * | 9/1972 | Livshitz | ............... | B04B 9/14 494/20 |
| 3,699,287 A * | 10/1972 | Stahl | ............... | H01H 35/144 200/61.45 R |
| 4,079,882 A * | 3/1978 | Mizuyoshi | ............... | B04B 5/0421 248/638 |
| 4,096,988 A * | 6/1978 | Scuricini | ............... | B04B 9/146 219/121.68 |
| 4,099,667 A * | 7/1978 | Uchida | ............... | B04B 9/146 200/233 |
| 4,193,536 A * | 3/1980 | Kubota | ............... | B04B 5/0421 494/14 |
| 4,450,391 A * | 5/1984 | Hara | ............... | B04B 13/00 318/480 |
| 4,491,019 A * | 1/1985 | Wicki | ............... | B04B 9/146 494/7 |
| 4,558,331 A | 12/1985 | Adkisson | | |
| 4,700,117 A * | 10/1987 | Giebeler | ............... | B04B 9/146 318/811 |
| 4,798,004 A | 1/1989 | Suzuki | | |
| 4,972,110 A * | 11/1990 | Gorodissky | ............... | B04B 9/146 310/68 E |
| 5,160,876 A * | 11/1992 | Niinai | ............... | B04B 9/146 318/460 |
| 5,199,937 A * | 4/1993 | Wada | ............... | B04B 5/0421 494/11 |
| 5,202,824 A | 4/1993 | Chen | | |
| 5,496,254 A * | 3/1996 | Keller | ............... | B04B 9/146 494/10 |
| 5,659,136 A * | 8/1997 | Koch | ............... | B04B 9/146 73/462 |
| 5,738,622 A * | 4/1998 | Niinai | ............... | B04B 9/146 494/10 |
| 5,800,070 A * | 9/1998 | Nilsson | ............... | B04B 9/12 384/535 |
| 5,800,331 A * | 9/1998 | Song | ............... | B04B 9/146 494/10 |
| 6,338,708 B1 * | 1/2002 | Miura | ............... | B04B 9/12 494/82 |
| 6,392,741 B1 | 5/2002 | Mori et al. | | |
| 6,949,063 B2 | 9/2005 | Baik et al. | | |
| 7,055,368 B2 * | 6/2006 | Schneider | ............... | B04B 9/146 494/10 |
| 7,108,651 B2 | 9/2006 | Konno et al. | | |
| 10,052,641 B2 * | 8/2018 | Letourneur | ............... | B04B 9/146 |
| 2002/0125373 A1 | 9/2002 | Kawasaki | | |
| 2009/0023571 A1 * | 1/2009 | Kusumoto | ............... | B04B 9/12 494/7 |
| 2015/0038311 A1 * | 2/2015 | Letourneur | ............... | B04B 9/146 494/9 |
| 2017/0008013 A1 * | 1/2017 | Eberle | ............... | B04B 9/12 |
| 2017/0328804 A1 * | 11/2017 | Eberle | ............... | B04B 9/12 |

FOREIGN PATENT DOCUMENTS

| | | | | |
|---|---|---|---|---|
| DE | 1101600 | | 3/1961 | |
| DE | 3922744 A1 | | 1/1991 | |
| DE | 19539633 A1 | | 4/1997 | |
| DE | 102008054089 A1 | | 5/2009 | |
| EP | 0770860 A2 | | 5/1997 | |
| EP | 3378566 A1 | * | 9/2018 | ............... B04B 9/10 |
| GB | 2146784 A | * | 4/1985 | ............. B04B 9/146 |
| GB | 2234319 A | * | 1/1991 | ............... B04B 9/12 |
| JP | S6443360 | | 2/1989 | |
| JP | 09010631 A | * | 1/1997 | |
| JP | H11169748 | | 6/1999 | |

OTHER PUBLICATIONS

The National Intellectual Property Administration of China, Translation of First Notification of Office Action, dated Sep. 5, 2018, pp. 1-8, Application No. 201580061715.0, Applicant: Andreas Hettich GMBH & Co. KG.
The National Intellectual Property Administration of China, First Notification of Office Action, dated Sep. 5, 2018, pp. 1-6, Application No. 201580051715.0, Applicant: Andreas Hettich GMGH & Co. KG.
Japan Patent Office, Translation of Notice of Reasons for Rejection, Office Action, Sep. 6, 2018, dated Sep. 11, 2018, pp. 1-4, Application No. 2017-525586.
Japan Patent Office, Notice of Reasons for Rejection, Office Action, September 6, 2018, dated Sep. 11, 2018, pp. 1-4, Application No. 2017-525586.

* cited by examiner

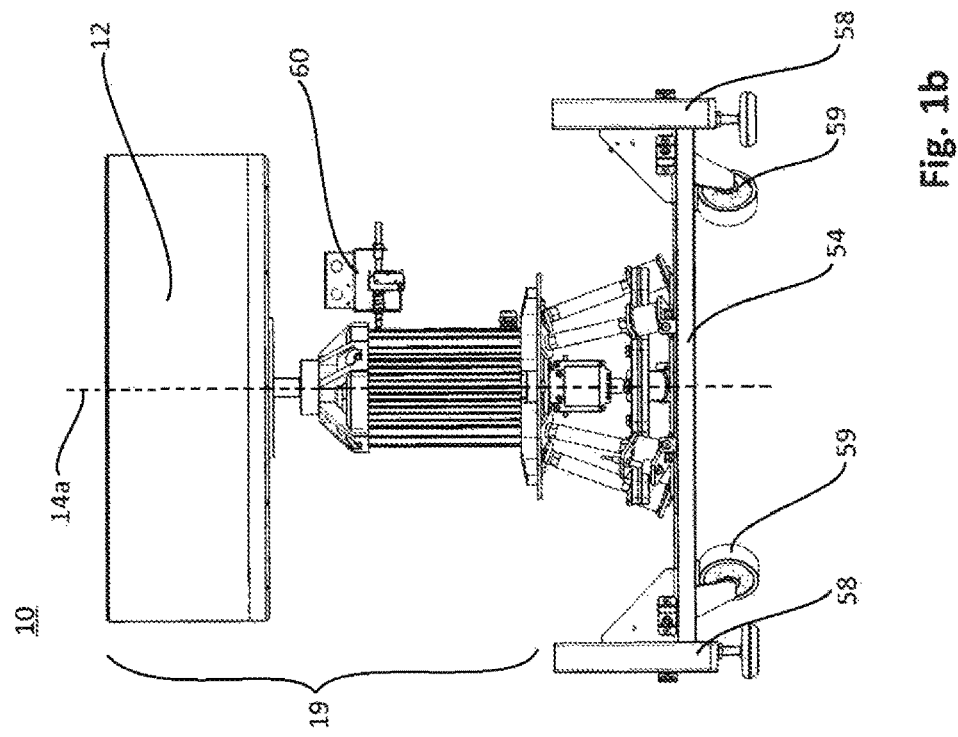
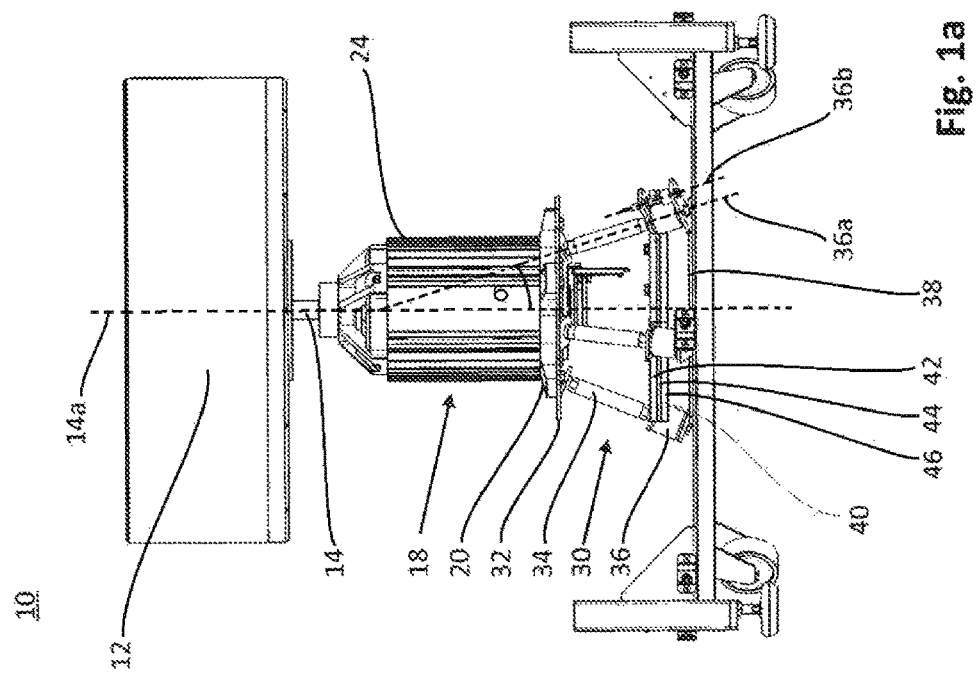

CENTRIFUGE AND METHOD FOR SENSING IMBALANCES IN THE CENTRIFUGE

This patent application is the national phase entry of PCT/EP2015/075163, international application filing date Oct. 29, 2015, which claims the benefit and priority of and to German patent application no. No. 10 2014 116 527.6, filed Nov. 12, 2014. PCT/EP2015/075163, international application filing date Oct. 29, 2015 and German patent application no. No. 10 2014 116 527.6, filed Nov. 12, 2014 are incorporated herein by reference hereto in their entireties.

BACKGROUND OF THE INVENTION

The invention relates to a centrifuge and to a method for sensing imbalances in the centrifuge.

Disclosed in DE 195 39 633 A1 is generic centrifuge which has a device for sensing imbalances of the rotating parts. Said device has a speed sensor, a distance sensor and an acceleration sensor. The acceleration sensor used in this case is a piezoelectric crystal sensor for detecting acceleration caused by imbalances. Furthermore, a control and evaluation unit is provided to which the signals detected by the sensors and relating to the imbalance are transmitted in the form of a change in the power oscillation/amplitude. A comparator is connected to the evaluation unit for comparing the signals received by the evaluation unit with reference data. If there are changes in the amplitude, an optical or acoustic warning will thus be issued or the centrifuge will be switched off. Both the piezo sensor and the distance sensor act in the same horizontal direction.

One disadvantage of this solution is that the sensors used will only detect a change in amplitude. They will provide no or only limited information regarding the cause and origin of imbalances. This makes it difficult to create differentiated measures such as the output of warnings or switching off the centrifuge on the basis of the change in amplitude, in particular taking into account the speed.

SUMMARY OF THE INVENTION

Therefore, it is the object of the invention to provide a centrifuge which avoids the above disadvantages and which is capable, besides merely detecting an imbalance, to also provide information on the cause and the origin of the imbalance. Furthermore, the centrifuge is to be developed further in such a manner that, in case an imbalance is detected, it will allow differentiated measures to be taken as a function of its rotational speed.

The invention is based on the finding that a distance sensor will provide much more informative data about imbalances and their cause/origin when the operative axis of the distance sensor extends in parallel or at an angle of less than 90° or at an acute angle relative to the rotational axis than when the operative axis of the distance sensor extends in perpendicular to the axis of rotation. In addition, the invention is based on the further finding that differentiated measures can be taken in the event of imbalances if the amplitude of the signals provided by the sensors is used as a basis, instead of the change in this amplitude.

The centrifuge according to the invention comprises the following elements: a housing; a rotor for receiving receptacles containing material to be centrifuged; a drive shaft on which the rotor is mounted; a motor which drives the rotor via the drive shaft; a supporting unit having damping elements each comprising a spring axis, which supporting unit supports the motor with the drive shaft and the rotor; a sensor unit for detecting the rotational speed; a distance sensor for detecting imbalances of the rotational unit formed by the rotor and the motor together with the drive shaft; an acceleration sensor for detecting imbalances of the rotational unit; and a control and evaluation unit which evaluates the sensor data. The distance sensor senses changes in distance in one operative axis. Moreover, the operative axis is aligned relative to the rotational axis of the rotor in such a way that—at least in a projection onto a plane parallel to the operative axis and through the rotational axis of the rotor—the operative axis and the axis of rotation define an angle between them which is less than 90°, including 0°. This is advantageous because it also allows detection of a tumbling motion/deviation of the rotational unit from its central position and therefore yields much more informative data than if such deviation were detected horizontally.

In a preferred embodiment, the operative axis of the distance sensor is aligned in parallel to the spring axis, since the stress on the suspension is a reliable indicator for imbalances and their magnitude, and a parallel arrangement of the distance sensor to the spring axis allows a precise measurement.

A particularly precise measurement can be achieved when the spring axis and the operative axis of the distance sensor are identical. This also simplifies the design since the distance sensor can easily be integrated into the suspension.

As a rotary sensor, magnetic or inductive sensors can be used, for example. However, light barriers, such as fork light barriers have proved particularly suitable because, in combination with a segment disk, they can also be used for simultaneous position detection. This will be explained in more detail below.

In a further advantageous embodiment, at least two acceleration sensors are provided for sensing imbalances in a space defined by three mutually perpendicular spatial axes, wherein each acceleration sensor is effective in a spatial axis different from that of the other acceleration sensors. The evaluation of acceleration data in respect of more than only one axis allows an even more accurate detection of an imbalance and also provides information about the cause for the imbalance, as will be explained in the following.

More specifically, one of the spatial axes in which an acceleration sensor is operative is the spatial axis in the vertical direction. Because, in contrast to a detected horizontal acceleration, i.e. along the x and/or y spatial axes, which only allows a measurement of the horizontal deviation of the axis of rotation, an additionally detected vertical acceleration also allows the measurement of a tumbling motion. Furthermore, conclusions can then be drawn from this about the cause and the origin of the imbalance, if the rotation and the respective angle of rotation in relation to the initial position/zero position are detected, e.g. by means of a segment disk of the speed sensor which has an absolute reference (0° position) and by means of light barriers. This data can then be used to determine the exact location within the rotational unit where the imbalance originates.

According to one aspect of the invention, the spring axis is aligned so as to intersect the axis of rotation. Arranging the damping elements in this way can be easily implemented technically, and the distance sensor can also easily be integrated into this arrangement.

Preferably, the operative axis and the spring axis are also identical. This makes it even easier to integrate the distance sensor into the damping elements and to directly detect the range of spring of the damping elements, which value can then be used to determine the deviation of the rotor from its central position.

In a further advantageous embodiment, a first characteristic is stored in the control and evaluation unit, which defines first limit values as a function of the rotational speed for the amplitude detected by the acceleration sensor and/or the distance sensor which describes the imbalance of the rotational unit. The first limit values are defined such that their being exceeded indicates a need for action, while there is no immediate danger to the safety of the centrifuge or the user yet. Therefore, the first limit values serve to initiate an alert level in the event of non-safety-critical relevant problems within the centrifuge, and further action can be avoided for the time being.

In an advantageous embodiment of the invention, a second characteristic is stored in the control and evaluation unit which defines second limit values as a function of the speed of rotation for the amplitude detected by the acceleration sensor and/or the distance sensor which describes the imbalance of the rotational unit. These second limit values are defined such that their being exceeded signals danger and an immediate need for action. It is the purpose of these second limit values to ensure that further measures can be taken immediately in the event of safety-relevant problems within the centrifuge so as to guarantee the safety of the centrifuge and its user.

Once the first limit value is reached, it is considered advantageous for the control and evaluation unit to activate an acoustic and/or optical signal unit and/or a display unit which latter may be integrated in the control panel of the centrifuge for example and which is used to display the evaluation results as well as instructions to the user regarding the measures to be taken. This ensure that the user will receive sufficient information for troubleshooting in time and that the centrifuge can remain in operation for the time being.

To ensure the safety of the centrifuge and the user in critical situations, it is defined that the control and evaluation unit will switch off the motor of the rotational unit or the entire centrifuge once the second limit value has been reached.

Once the second limit value has been reached, it is advantageous for the control and evaluation unit to also activate an acoustic and/or optical signal unit and/or a displace device which latter will then display the evaluation results as well as instructions to the user as to the measures to be taken. This drastically reduces the time required for trouble spotting and troubleshooting in critical situations and considerably improves user comfort.

It is furthermore advantageous if a data logger is also provided in the control and evaluation unit, which records all the determined data. The data can then be read out at the end of the centrifuge operation, for example via a USB port, and made available for maintenance, troubleshooting, product lifecycle management etc.

According to one aspect of the invention, the distance sensor is used is for the detection of imbalances in a speed range of less than 1,000 rpm. This makes it possible to detect an imbalance already at lower speeds, at which the acceleration forces are still too small to be reliably detected by acceleration sensors.

According to yet another aspect of the invention, the acceleration sensor is used for the detection of imbalances in a speed range of above 1,000 rpm. At this higher speed range, the acceleration sensor is better suited than the distance sensor, because an acceleration measurement provides more accurate data than a distance measurement at this frequency.

However, the speed ranges in which either the distance sensor or the acceleration sensor provides more reliable data, depend very much on the design of the centrifuge, in particular its damping. It is therefore advantageous to make the rotational speed ranges configurable by means of the firmware.

The object for the method is accomplished in that sensor measurement values are taken as a function of the continuous revolution, and an average value is formed from the values measured and is compared with the corresponding value of the characteristic. If the average value is above the characteristic, further measures will then be initiated, such as switching off the motor of the rotational unit, reducing the speed of the rotor, triggering acoustic and/or optical signals and/or outputting information on a display unit and the like.

The apparatus and the method of the invention are to be used for detecting a potential imbalance of the rotational unit of the centrifuge, and the control and evaluation unit is to respond to such imbalance in a predetermined manner. In addition, operation data is to be collected, stored and made available for evaluation, in particular so as to allow conclusions to be drawn as to the load and the service life of the centrifuge and its components. For this purpose, the following data will be recorded in a data logger for each centrifuge operation cycle: duration of the centrifugation step, maximum speed, maximum imbalance amplitude, speed at the occurrence of the maximum imbalance amplitude, imbalance angle, deviation from the central position and system state indicators (flags). In addition, further relevant data can be recorded if required, such as temperature or noises.

For example, as a result of the data determined, the motor of the rotor or the entire centrifuge may be switched off if the imbalance exceeds a limit value defined by a characteristic. In addition or alternatively, information may be provided regarding the maintenance or wear condition of the damping elements, for example the rubber-metal elements used in a motor stand. It is also possible to provide information to the user as to which receptacle of the rotor is causing the imbalance, possibly by incorrect loading. In addition, when servicing is required, a display device may also display technical guidance on how to balance the rotor.

The rotary sensor for detecting the rotation may be of the following design: Mounted on the motor axle is a segment disk having 30 equally spaced recesses as well as a single cam at the 0° position (absolute reference). A light barrier, for example a fork light barrier, detects the current angle of rotation in 6° steps, 60 times 6° equaling 360°, also taking into account the edge changes. A second fork light barrier which is arranged such that it provides a signal that is offset by 90° from the signal of the first fork light barrier, detects the direction of rotation. A retroreflective sensor is used to detect the 0° position.

As set out above, four sensors are used to detect any data relevant for sensing imbalances, i.e. the rotary sensor, the acceleration sensor for detecting the acceleration in a first spatial axis, the acceleration sensor for acceleration detection in the second spatial axis, and the distance sensor. In addition, another acceleration sensor may be provided for detecting the acceleration in the third spatial axis.

More specifically, the three acceleration sensors are designed as a triaxial acceleration sensor. All three acceleration sensors are thus combined in one unit. This unit is preferably mounted directly on an electronics board which is attached near the shaft in the area of a lower motor mount. Alternatively, the unit can also be arranged in the rotor.

The distance sensor may be in the form of an inductive proximity sensor. The measuring range in particular detects changes of 4 mm, preferably up to 6 mm. This measurement detects relative changes in the distances between a support plate and/or a second elastic lug and a fixing plate and/or a third elastic lug of the motor stand. The adjustment can be made using a simple mechanical gauge and does not need to be particularly precise.

While the vertical oscillation of the support plate of the centrifuge is also influenced by the design of the centrifuge, experience has shown that it will only reach a characteristic maximum at approx. 150 to 200 rpm. This maximum can only be detected by the distance sensor because at these speeds, the acceleration forces will still be too small for the measuring range of the acceleration sensor. As an imbalance should be detected as soon as possible, i.e. at low speeds of rotation, the distance sensor will have to be used for this purpose. For speeds of above approx. 1,000 rpm, the acceleration sensor is better suited for reliably detecting an imbalance. However, any deviation from the central position, i.e. raising of the rotor at high speeds, can only be detected by the distance sensor.

Moreover, it is conceivable to provide a distance sensor for data detection in each spring axis, for example above a damping element. Based on the captured data, the evaluation unit will then be able to detect any incorrect/asymmetrical loading which would result in a higher imbalance during centrifugation, immediately before the operation of the centrifuge. A display unit will then warn the user not to start centrifuge operation, or the control unit can prevent the centrifuge from being started in the first place.

More specifically, the value used for assessing the imbalance is calculated as follows:

At a frequency of 9.6 kHz, the control and evaluation unit continuously captures the following values on four different channels: By means of the distance sensor, the distance between the support plate and the fixing plate; by means of the acceleration sensor, the acceleration along the x axis; by means of the acceleration sensor, the acceleration along the y axis; and by means of the acceleration sensor, the acceleration along the z axis. Thus four sensors are used for this measurement: the distance sensor, the acceleration sensor for the x axis, the acceleration sensor for the y axis and the acceleration sensor for the z axis.

Because the measured values are transmitted on four different channels, they are simultaneously available for evaluation by the control and evaluation unit. The measured values detected at 9.6 kHz are then used to form average values as a function of the speed of rotation.

As has been set out above, the rotary sensor has recesses in a segment disk which cooperate with a light barrier. At the beginning of a recess, a signal is generated for the period of time until the light beam reaches the end of said recess, owing to the rotation of the segment disk. During this time, the light of the light barrier hits the associated light sensor, thus generating the signal. At the beginning and at the end of the signal, signal edges are generated. The signal edge thus changes at the beginning and at the end of the signal. At a signal edge change during rotation of the segment disk, the control and evaluation unit generates an average value. This average value is based on all measured values of a sensor detected by this sensor since the last edge change. The 60 measuring points yield the signal curve which has a sine-wave like appearance. Depending on the sensor, different amplitudes and phase angles will be obtained.

For each rotation, each sensor will yield a signal curve composed of the 60 measuring points. This signal curve is then used to determine the effective value of the signal (RMS) and the DC offset for each sensor. The signal curve is corrected by the DC offset which is obtained from the average value of the 60 measuring points so as to yield the pure AC signal component which latter is therefore symmetrical to zero.

The effective values of the four sensors are then weighted and summed in the control and evaluation unit, i.e. each effective value is multiplied by a configurable factor and the results are then added. In the following, the result is referred to as the sensors sum. This sensors sum is primarily used for performing an assessment of the imbalance by a comparison of the determined values with configurable limit values, as will be explained below. Furthermore, the sensors sum is also required for determining the imbalance angle.

The imbalance angle is determined as follows: The angle at which the maximum amplitude of the sensors sum is measured does not correspond to the angle at which the maximum imbalance is actually located since various influences such as speed of rotation, weighting of the sensors, magnitude of the imbalance, and the like will cause an angle shift of the maximum amplitude. For this reason, the angle of the imbalance and thus ultimately the determination which receptacle of the rotor is affected, will be determined at a low speed of rotation and exclusively by means of the distance sensor.

For example, for this exact position determination, the distance sensor senses the imbalance at a constant speed of rotation, e.g. 190 rpm, and at the same time, the angle of rotation relative to a zero point of the rotor—0° position—is measured at which the sinusoidal signal of the distance sensor has its maximum.

Measurements show that the phases of the sinusoidal signal of the distance sensor depend on the weight of the imbalance. For example, between 2.5 g and 60 g of an imbalance will cause the angle of rotation to be shifted by approx. 70°. In the evaluation unit, this influence is then corrected by means of a logarithmic correction curve. This curve is defined by the following formula:

$$\phi(imbalance) = \phi(distancesensorsinusmax) \times A1 \times \ln(imbalanceamplitude) + A2$$

The correction factor $A1$ (no units) determines the gain of the logarithmic curves of the imbalance amplitude, the factor $A2$ (in °) determines the position of this curve.

The data corrected accordingly indicate the exact location of the imbalance in the rotor and thus the position of the receptacle in the rotor which is causing the imbalance. The evaluation unit then communicates this position to the user on the display unit so that the user can take appropriate measures.

Another reason for the use of the distance sensor for determining the imbalance angle is furthermore that the low speed of rotation inevitably occurs during deceleration/slowing down. The imbalance angle only becomes relevant to the user with the machine at standstill which is when the user can then check the receptacle which has been found to cause the imbalance. Furthermore, a complex correction (modelling) of the variable influences on the angle, such as speed of rotation, imbalance weight, is not necessary since these factors are practically negligible at low speeds of rotation.

The determination/evaluation of the deviation of the rotor from its central position may be performed as follows, where it is to be noted first that gyroscopic forces will cause the rotation axis to align vertically with increasing speed of rotation, regardless of the imbalance. This causes a shift from the central position around which the mass of the rotational unit swings. This shift in the central position may be detected by the distance sensor in the following manner.

The central position corresponds to the average value of the 60 measuring points of the distance sensor calculated as a function of the angle within one rotation of the rotor, see the above explanation regarding the calculation of the value used for assessing the imbalance. It corresponds to the absolute position of the rotational oscillation on the ordinate. The value of the central position is stored at two predetermined speed values, e.g. 500 rpm and 2,500 rpm. The difference of the central position values at these thresholds is then weighted. The absolute value of the difference is compared with a maximum threshold to be defined. If the maximum threshold, a first limit value, is exceeded, a warning will be displayed but the machine will not be switched off.

An excessive deviation may be caused by:
  an incorrect alignment of the machine, e.g. the machine is not aligned horizontally.
  defect(s) in the damping elements, e.g. the rubber-metal elements of the rotor bearing.

Preferably, the maximum admissible imbalance may be detected as follows.

The threshold for detecting an inadmissible imbalance and thus for switching off the machine is implemented via so-called switch-off windows. Each switch-off window consists of a data record in which it has been configured under which conditions the machine fulfills the conditions for activation of the switch-off window, i.e. the associated threshold value is checked and the machine is switched off, if necessary. A switch-off window will be activated if the current speed is within the configured speed limits, and the current acceleration is within the configured acceleration limits, and these conditions are permanently fulfilled for a configured debouncing time, i.e. the predetermined period in which the signal has to be present at one input at least of the control and evaluation unit for it to be detected and further processed by the control and evaluation unit.

The entry of data records preferably serves to define individual process steps of the centrifuge—e.g. sedimentation, separation—for which a specific procedure each is specified in the event an imbalance is detected. For example, a distinction is made between a sedimentation step and a separation step. The distinction is made by specifying speed thresholds in different switch-off windows. For example, speeds of above 1,000 rpm may be associated with the sedimentation step, and speeds of less than 1,000 rpm may be associated with the separation step. In this case, the switch-off windows are configured in such a way that the control and evaluation unit will not switch off the machine during separation, so as to increase productivity. The additional imbalance limit switch provided in each centrifuge remains unaffected by this, but will remain active at all times.

In plateau phases, i.e. when there is no acceleration at a constant speed, the control and evaluation unit does not need to be able to detect whether a process step was reached by an acceleration or deceleration process, i.e. which production step is being performed at the moment.

Additional advantages, features and possible applications of the present invention may be gathered from the description which follows, in which reference is made to the embodiments illustrated in the drawings.

BRIEF DESCRIPTION OF THE DRAWINGS

Throughout the description, the claims and the drawings, those terms and associated reference signs are used as are listed in the list of reference signs below. In the drawings:

FIG. 1a is a view of the rear of the centrifuge of FIG. 1;

FIG. 1b is a view of the left side of the centrifuge of FIG. 1;

DESCRIPTION OF THE INVENTION

Figure 1:
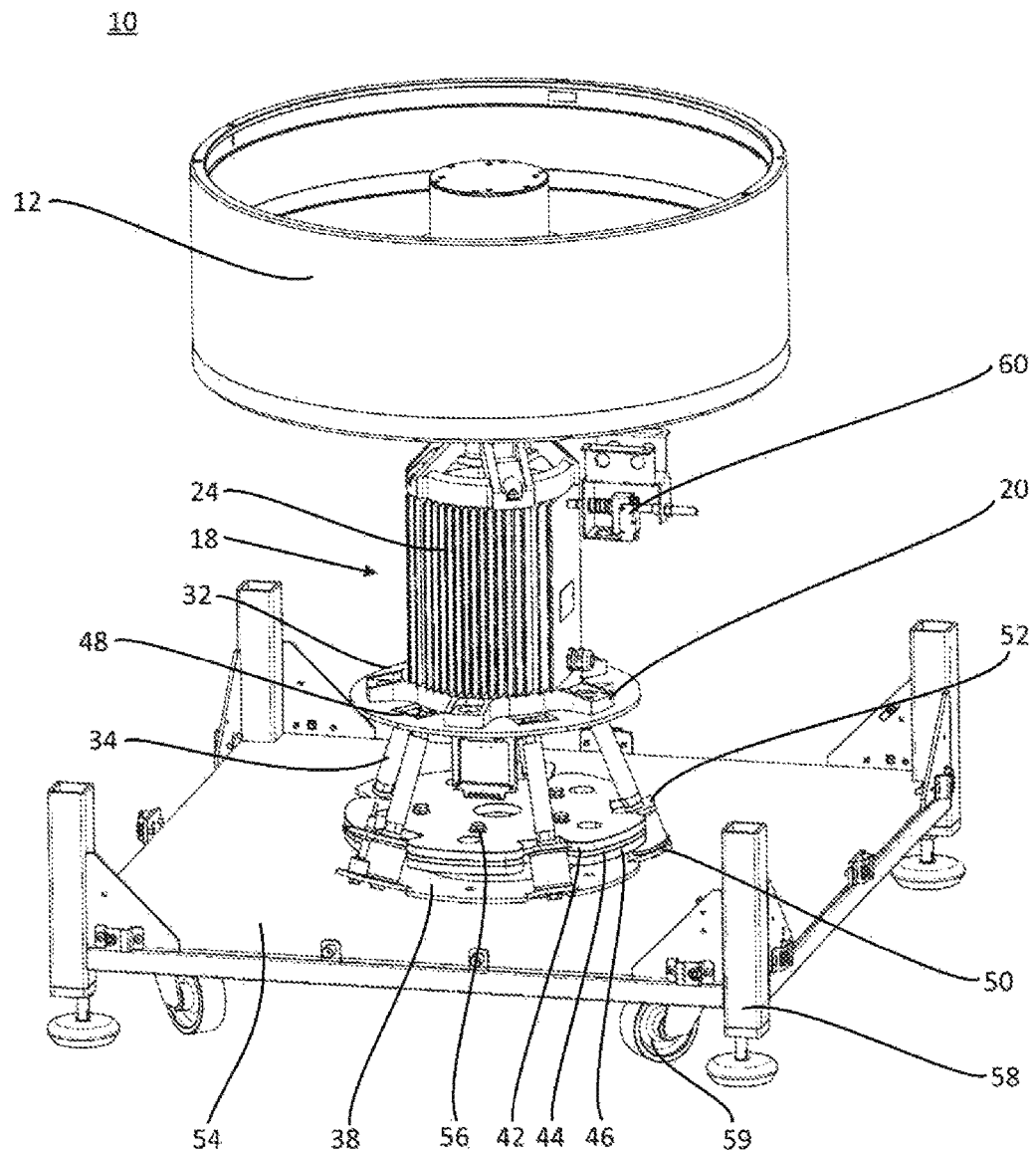
FIG. 1 is a perspective view of the centrifuge according to the invention, with a support element and without its housing, in which the front of the centrifuge faces right, as viewed by the observer.

FIGS. 1, 1a and 1b, respectively, are a perspective view, see FIG. 1, a rear view, see FIG. 1a, and a view of the left side, see FIG. 1b, each of a laboratory centrifuge 10. To provide a better view of the elements that are essential to the invention, the centrifuge housing has been omitted from these figures.

At the top end of a longitudinal and rotation axis 14a of a motor 18, which is at the same time the rotation axis of the centrifuge 10, there is a rotor 12 which receives receptacles containing material to be centrifuged. The rotor 12 is mounted on a motor shaft 14 which is driven by the motor 18 located underneath it. The motor 18 is surrounded by a motor housing 24. In a known manner, the motor shaft 14 is non-rotatably connected to the rotor 12, for example by means of a spline shaft not shown here.

On the side of the motor 18 facing away from the rotor 12, the motor housing 24 is provided with mounting feet 20 which are uniformly spaced from each other and firmly connect the motor 18 to an upper support plate 32 of a supporting unit 30. The supporting unit 30 serves to support the motor 18 as well as to dampen forces caused by the rotation of the rotor 12.

Arranged adjacent to the motor housing 24 is a mechanical limit switch 60 which is firmly connected to the centrifuge housing (not shown) via a conventional screw connection. More specifically, the mechanical limit switch 60 is spaced from the motor housing 24 in such a way that in trouble-free operation, in the event of a tumbling motion of the rotor 12 within the usual tolerance limits, the mechanical limit switch 60 will not make contact with the motor housing 24. If the tumbling motion of the rotor 12 is so strong that the supporting unit 30 cannot compensate it anymore and thus causes a horizontal shift of rotation axis 14a and thus of the motor 18 which exceeds the tolerance limits, the mechanical limit switch 60 will make contact with the motor housing 24. This contact will result in an emergency switch-off of the centrifuge 10 triggered by a control and evaluation unit 90 which is explained with reference to FIG. 3.

On the side of the supporting unit 30 which faces away from the motor 18 there is a lower support plate 38. Mounted on the lower support plate 38 are inclined rubber-metal elements 36 which serve as damping elements and which are firmly connected to the upper support plate 32 via struts 34 inclined at the same angle. With respect to the longitudinal axis 14a, generally angles of between 10° and 42° are considered advantageous as setting angles σ for the rubber-metal elements 36 and the struts 34 connected thereto, because the forces which are based on imbalance will act in this angle range during rotation of the rotor 12. For the present embodiment of the centrifuge 10, a setting angle σ of 21° has proven particularly suitable.

It is furthermore conceivable to design the supporting unit 30 without the struts 34, for example, and to connect the rubber-metal elements 36 directly to the upper support plate 32. However, it has been found that the increased diameter at the bottom side of the supporting unit 30 results in higher stability and thus an improved damping effect. As an alternative, spring bearings, magnetic bearings or hydraulic bearings can also be used as damping elements, for example. An especially good price/performance-ratio is obtained when using the rubber-metal elements 36 chosen for the centrifuge 10 of the invention.

Lastly, between the upper support plate 32 and the lower support plate 38 a mass element 40 is provided which is firmly connected to the struts 34 and the rubber-metal elements 36. The inclined position of the rubber-metal elements 36 and the spacing of the rubber-metal elements 36 from the motor 18 by means of the struts 34 already ensures a good damping effect, meaning that the mass element 40 could also be eliminated. However, adding a mass element 40 will clearly improve the damping effect even more.

Via the lower support plate 38, the centrifuge 10 is non-rotatably mounted on the support element 54. On the upper support plate 32, between each pair of mounting feet 20, a first elastic lug 48 can be seen, which accommodates the end of a strut 34 which faces the upper support plate 32 and thus connects the respective strut 34 elastically to the upper support plate 32. The first elastic lugs 48 may also be separate elements which are for example welded onto the upper support plate 32. However, the stability of the supporting unit 30 is increased if the first elastic lugs 48, as in the embodiment illustrated, are integrally formed with the upper support plate 32 and made of the same material as the upper support plate 32, for example by means of a die-cutting and bending process.

The lower limit of the supporting element 30 is formed by a lower support plate 38 which is connected to the rubber-metal elements 36 via second elastic lugs 50. Arranged between the lower support plate 38 and the upper support plate 32 is the mass element 40. The mass element 40 consists of three vertically stacked plates. At the center there is a fixing plate 44 which is elastically connected to the rubber-metal elements 36 and to the struts 34 via third elastic lugs 52. Above and below the fixing plate 44, there is a disk-shaped upper mass plate 42 and a disk-shaped lower mass plate 46 resp., which are both firmly connected to the fixing plate 44. In this embodiment, analogous to the first elastic lugs 48, the second elastic lugs 50 and the third elastic lugs 52 are integrally formed with the respective associated lower support plate 38 and/or fixing plate 44 and made of the same material as the respective associated plate.

Screw connections 56 firmly connect the supporting unit to the support unit 54 via the lower support plate 38. The support element 54 has supporting legs 58 at its four corners, and adjacent to these supporting legs 59 there are castors 59 on which the centrifuge 10 is supported on the ground.

Figure 2:
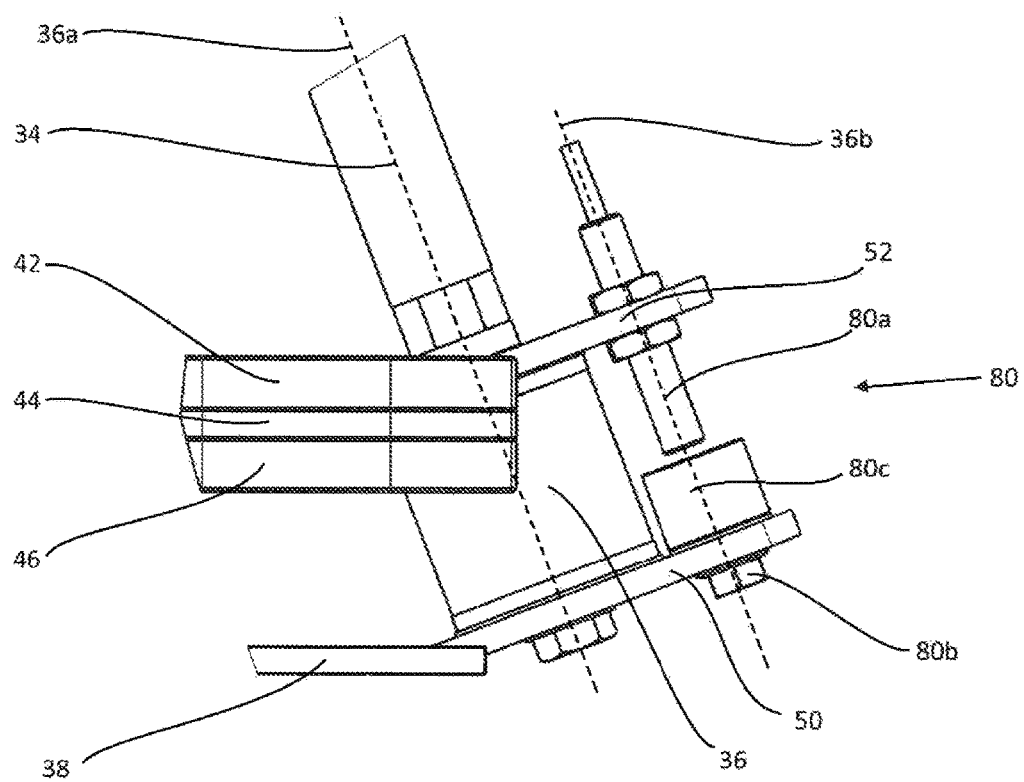
FIG. 2 is a schematic partial view of the distance sensor shown in FIGS. 1, 1a and 1b in its mounted state.

FIG. 2 is a detailed view of the arrangement of the distance sensor 80. The distance sensor 80 is designed as an inductive sensor and comprises a sensor head 80a which houses an induction coil that is not shown for the sake of clarity. The sensor head 80a is disposed in a third elastic lug 52 and has an operative axis 36b which extends in parallel to the spring axis 36a. Mounted on the second elastic lug 50 associated with the third elastic lug 52 is a metal head 80c which cooperates with the sensor head 80a. The metal head 80c is screw-connected to the second elastic lug 50. For this purpose, the metal head 80c has a threaded pin which engages a bore in the second elastic lug 50 and is secured with a nut 80b placed on the threaded pin. In the event of vertical oscillations of the rotor 12 due to an imbalance, the struts 34 will transfer these oscillations to the rubber-metal elements 36 for damping, and this will result in a change of the longitudinal extension of the rubber-metal elements 36 along the spring axis 36a. This will also change the distance between the third elastic lug 52 and its associated second elastic lug 50. These changes in distance can be accurately measured by the distance sensor 80, and the imbalance can be calculated on the basis of the measured data, in particular at low speeds of the centrifuge of up to 1,000 rpm.

Figure 3:
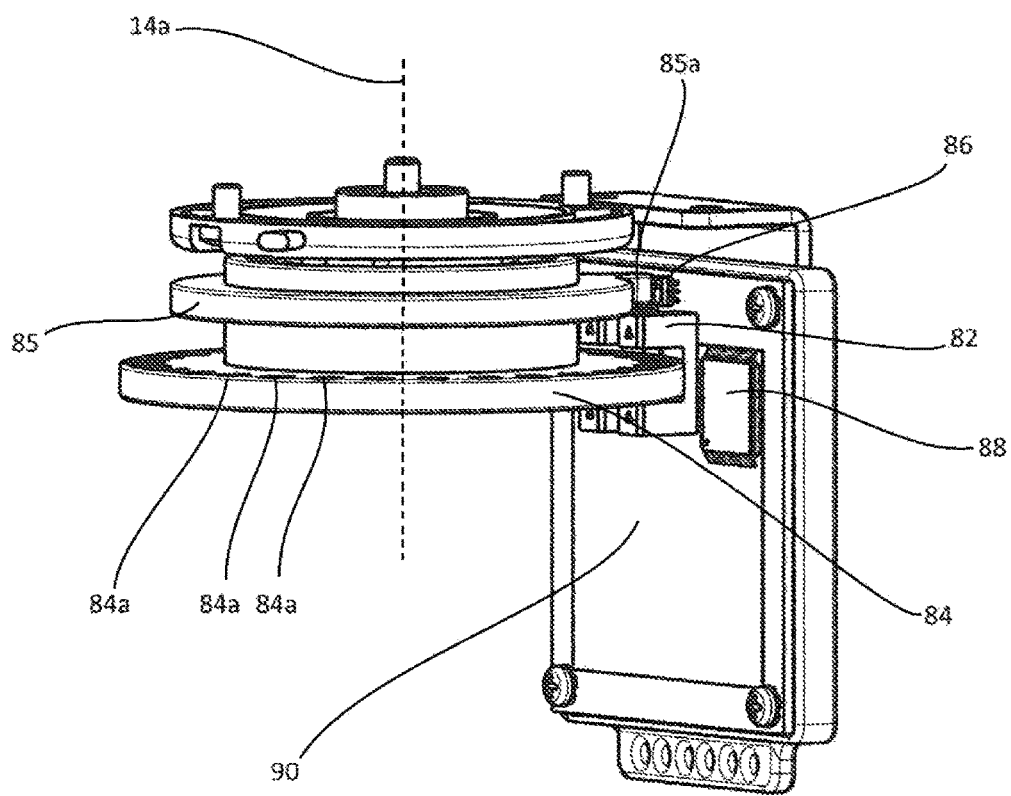
FIG. 3 is a schematic partial view of the control and evaluation unit shown in FIGS. 1, 1a and 1b.

FIG. 3 is a schematic view of the control and evaluation unit 90. As can be seen from FIGS. 1, 1a and 1b, the control and evaluation unit 90 is arranged in one unit with a segment disk 84, a fork light barrier 82, a retroreflective sensor 86 and an acceleration sensor 88 below the motor 18. The distance sensor 80 shown in FIG. 2, the fork light barrier 82, the retroreflective sensor 86 and the acceleration sensor 88 as well as a control panel (not shown) arranged on the centrifuge housing with an integrated display unit are connected to the control and evaluation unit 90. Additional distance sensors 88 may be located in the area of the struts 34, for example on the first or the second lug 50, 52. Furthermore, an electric switch (not shown) for switching off the centrifuge 10 in the event of a failure is provided in the control unit 90. The electric switch is in the form of a break contact and is connected in series with the mechanical limit switch 60, which is also in the form of a break contact, so that the opening of one of these two switches will cause the centrifuge 10 to be switched off.

Figure 4:
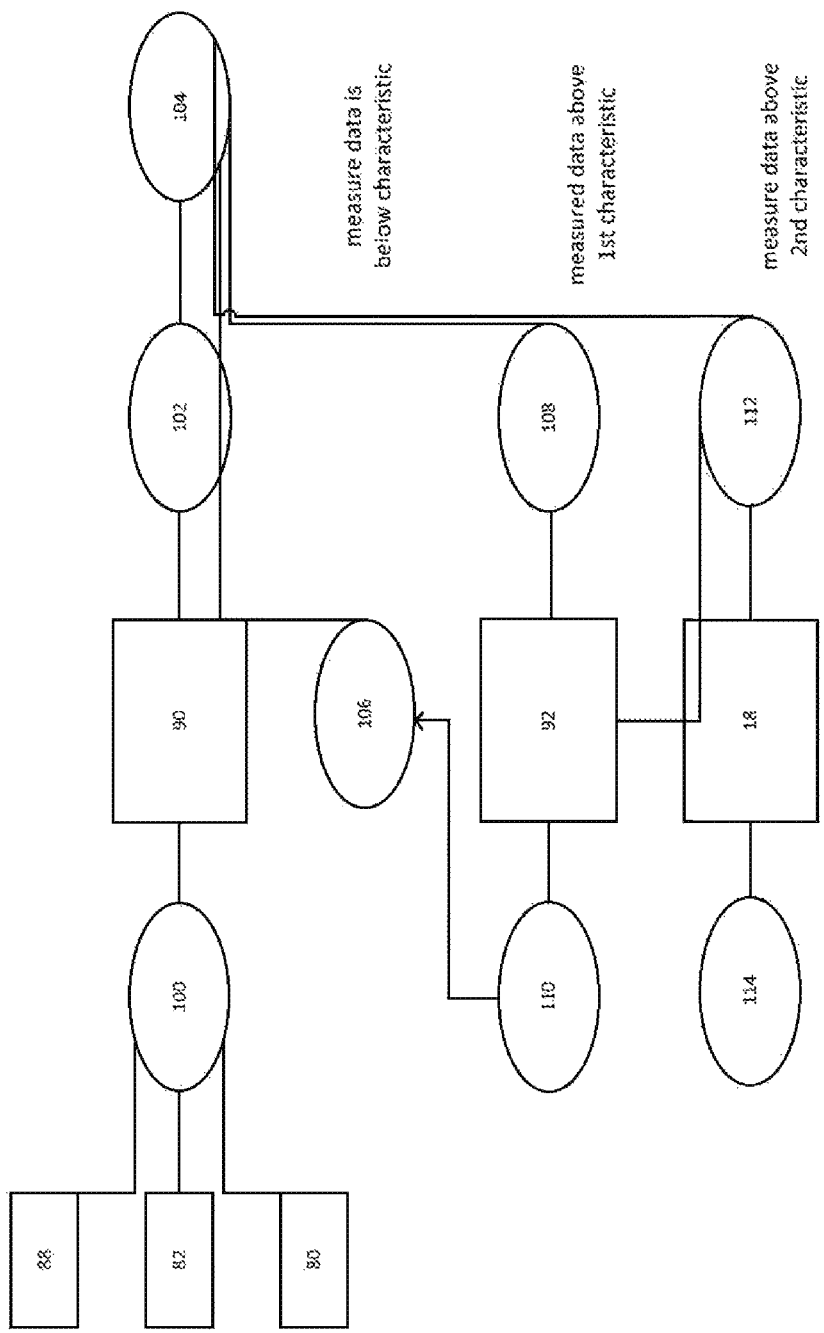
FIG. 4 is a flow chart for detecting an imbalance in the centrifuge according to the invention.

The segment disk 84 is non-rotatably and concentrically mounted on the motor shaft 14 not shown in FIG. 4 so that it will rotate around the rotation axis 14a during operation of the centrifuge 10. The segment disk 84 has 30 recesses 84a circumferentially arranged on it and uniformly spaced from each other. The fork light barrier 82 which is mounted on the control and evaluation unit 90 and partially surrounds the segment disk 84 allows the speed of the centrifuge 10 to be determined based on the recesses 84a. Furthermore, a disk 85 is provided above the segment disk 84 which includes a cam 85a. Said cam 85a serves as an absolute reference for a 0° position for the detection of which a retroreflective sensor 86 is provided. The detection of the 0° position by means of the retroreflective sensor 86 and the detection of the recesses 84a by means of the fork light barrier 82 also allows the angle of rotation and the direction of rotation to be determined in the control and evaluation unit 90. The acceleration sensor 88 which is arranged adjacent to the fork light barrier 82 is operative in three spatial axes x, y and z and serves to detect imbalances, in particular at speeds of >1,000 rpm.

FIG. 4 is a schematic view of a method for detecting an imbalance in a centrifuge 10 according to the invention.

The distance sensor 80, the fork light barrier 82 in connection with the retroreflective sensor 86 and the acceleration sensor 88 provide measured data to the control and evaluation unit 90 for detecting imbalances, at step 100. Such measured data is then evaluated in the control and evaluation unit 90, at step 102, and compared to two predetermined characteristics, at step 104.

If the measured data is below the first characteristic, the imbalance is found to be insignificant and the operation is continued and no further measures are taken, at step 106. If the measured data is above the first characteristic, but still below the second characteristic, a display unit 108 is activated and a corresponding warning is output, at step 110. However, operation continues, at step 106. However, in the event the measured data is also above the second characteristic, both the display unit 108 and the motor 18 are activated. A warning is then displayed on the display unit, at step 110, and the motor 18 is switched off, at step 114.

LIST OF REFERENCE SIGNS 10 centrifuge
12 rotor
14 motor shaft
14a rotation axis
18 motor
19 rotational unit
20 mounting feet
24 motor housing
30 supporting unit
32 upper support plate
34 struts
36 rubber-metal elements
36a spring axis
36b operative axis
38 lower support plate
40 mass element
42 upper mass plate
44 fixing plate
46 lower mass plate
48 first elastic lugs
50 second elastic lugs
52 third elastic lugs
54 support element
56 screw connections
58 supporting legs
59 castors
60 mechanical limit switch
80 distance sensor
80a sensor head
80b nut
80c metal head
82 fork light barrier
84 segment disk
84a recesses
84b cam
86 retroreflective sensor
88 acceleration sensor
90 control and evaluation unit
σ setting angle
100 provide measuring data
102 evaluate measuring data
104 compare measuring data to predetermined characteristics
106 continue operation
108 activate display unit
110 output warning
112 activate display unit and motor
114 switch off motor

The invention claimed is:

1. A centrifuge (10), comprising:
a rotor (12);
a drive shaft (14);
said rotor (12) is mounted on said drive shaft;
a motor (18);
said motor drives said drive shaft and said rotor (12);
a supporting unit (30) having damping elements (36);
each of said damping elements includes a spring axis (36*a*);
said supporting unit (30) supports a rotational unit (19);
said rotational unit comprises said motor (18) together with said drive shaft (14) and said rotor (12);
a sensor unit (82, 84) for detecting the speed of said drive shaft and said rotor;
a distance sensor (80) for detecting imbalances of said rotational unit (19);
said rotational unit (19) rotates around an axis of rotation (14*a*) at a rotational speed;
an acceleration sensor (88) for detecting imbalances of said rotational unit (19);
a control and evaluation unit (90) which evaluates data of said sensors and said sensor unit (80, 82, 88);
said distance sensor (80) includes a sensor head (80*a*) and a metal head aligned along an operative axis (36*b*);
said distance sensor (80) detects changes in distance between said sensor head (80*a*) and said metal head along said operative axis;
said operative axis (36*b*) is aligned relative to said axis of rotation (14*a*) in such a way that—at least in a projection onto a plane which is parallel to said operative axis (36*b*) and extends through said axis of rotation (14*a*)—said operative axis (36*b*) and said axis of rotation (14*a*) define an angle between them which is less than 90°, including 0°.

2. The centrifuge according to claim 1 wherein said operative axis (36*b*) of said distance sensor (80) is aligned in parallel to said spring axis (36*a*) of one of said damping elements.

3. The centrifuge according to claim 1, further comprising:
at least two acceleration sensors (88) are provided for determining the imbalance in a space defined by three mutually perpendicular spatial axes (x, y, z), each said acceleration sensor (88) being operative in a spatial axis (x, y, z) different from that of the other acceleration sensor (88).

4. The centrifuge according to claim 3 wherein one of said spatial axes (x, y, z) in which one of said acceleration sensors is operative is the spatial axis in said vertical direction (z).

5. The centrifuge according to claim 1 wherein one of said spring axes (36*a*) of one of said damping elements intersects said axis of rotation (14*a*).

6. The centrifuge according to claim 1 wherein said operative axis (36*b*) and one of said spring axis axes (36*a*) are identical.

7. The centrifuge according to claim 1 wherein a first characteristic is stored in the control and evaluation unit (90), said first characteristic defines limit values as a function of the rotational speed for the amplitude detected by said acceleration sensor (88) and/or said distance sensor (80), said amplitude describes the imbalance of the rotational unit (19).

8. The centrifuge according to claim 7 wherein said control and evaluation unit (90) stores a second characteristic, said second characteristic defines second limit values as a function of the rotational speed for the amplitude detected by said acceleration sensor (88) and/or said distance sensor (80), said amplitude describes the imbalance of the rotational unit (19).

9. The centrifuge according to claim 8 wherein said control and evaluation unit switches off the motor of said rotational unit and/or of said centrifuge upon reaching one of said second limit values with respect to any one of said spring axes (36*a*).

10. The centrifuge according to claim 9 wherein said control and evaluation unit activates an acoustic and/or visual signal unit and/or a display unit, said display unit is used to display the evaluation result and instructions to a user.

11. The centrifuge according to claim 7 wherein said control and evaluation unit activates an acoustic and/or visual signal unit and/or a display unit upon reaching a first of said limit values, said signal and/or display unit is used to display the evaluation result and instructions to a user.

12. The centrifuge according to claim 1 wherein said distance sensor is operative for detection of imbalances in a low speed range of said centrifuge.

13. The centrifuge according to claim 1 wherein said acceleration sensor is operative for detection of imbalances in a high speed range of said centrifuge.

14. A method for detecting imbalances in a centrifuge, said centrifuge (10), comprising:
   a rotor (12);
   a drive shaft (14);
   said rotor (12) is mounted on said drive shaft;
   a motor (18);
   said motor drives drive shaft and said rotor (12);
   a supporting unit (30) having damping elements (36);
   each of said damping elements includes a spring axis (36*a*);
   said supporting unit (30) supports a rotational unit (19);
   said rotational unit comprises said motor (18) together with said drive shaft (14) and said rotor (12);
   a sensor unit (82, 84) for detecting the speed of said drive shaft and said rotor;
   a distance sensor (80) for detecting imbalances of said rotational unit (19);
   said rotational unit (19) rotates around an axis of rotation (14*a*) at a rotational speed;
   an acceleration sensor (88) for detecting imbalances of said rotational unit (19);
   a control and evaluation unit (90) which evaluates data of said sensors (80, 82, 88);
   said distance sensor (80) includes a sensor head (80*a*) and a metal head aligned along an operative axis (36*b*);
   said distance sensor (80) detects changes in distance between said sensor head (80*a*) and said metal head along said operative axis (36*b*);
   said operative axis (36*b*) is aligned relative to said axis of rotation (14*a*) in such a way that—at least in a projection onto a plane which is parallel to said operative axis (36*b*) and extends through said axis of rotation (14*a*)—said operative axis (36*b*) and said axis of rotation (14*a*) define an angle between them which is less than 90°, including 0°, comprising the steps of:
   measured values of said sensors and said sensor unit are determined as a function of the continuous rotation of said rotor:
   said measured values are used to form an average value which is compared with the corresponding value of a known performance characteristic of said centrifuge, and,
   further measures being initiated when an average value is detected that is above said known performance characteristic of said centrifuge,
   said further measures comprise switching off said motor of said rotational unit, reducing the rotational speed of said rotor, activating said acoustic and/or optical signals and/or outputting information on a display unit.

15. The method according to claim 14, further comprising the step of:
   an angle of the imbalance relative to a zero point of said rotor is determined from said measured values.

16. The method according to claim 14, further comprising the step of:
   deviation of the rotational unit from a central position is determined from the values measured by said distance sensor.

17. The method according to claim 14, further comprising the step of:
   said control and evaluation unit receives the signals of said distance sensor and the said acceleration sensors sensor of respective spatial axes simultaneously.

18. The method according to claim 17, further comprising the step of
   the signal for each sensor is transmitted via a separate signal channel.

\* \* \* \* \*